United States Patent
Claghorn et al.

[19]

[11] Patent Number: 6,119,936
[45] Date of Patent: Sep. 19, 2000

[54] BILL VALIDATOR HAVING A MAGNETIC READ HEAD WITH PRESSURIZING DEVICE

[75] Inventors: Roger O. Claghorn; Gary M. Ochterbeck, both of St. Louis, Mo.

[73] Assignee: Coin Acceptors, Inc., St. Louis, Mo.

[21] Appl. No.: 09/096,643

[22] Filed: Jun. 12, 1998

[51] Int. Cl.⁷ ........................................... G06K 7/08
[52] U.S. Cl. .................. 235/449; 235/439; 235/485
[58] Field of Search .................... 235/380, 381, 235/439, 449, 475, 485

[56] References Cited

U.S. PATENT DOCUMENTS

| | | | |
|---|---|---|---|
| 4,482,058 | 11/1984 | Steiner | 235/379 X |
| 4,858,744 | 8/1989 | Dolejs et al. | 194/206 |
| 4,958,715 | 9/1990 | Suris | 194/206 |
| 5,310,173 | 5/1994 | Martinez | 271/198 |

*Primary Examiner*—Michael G Lee
*Assistant Examiner*—Diane I. Lee
*Attorney, Agent, or Firm*—Cohn, Powell & Hind

[57] ABSTRACT

This bill validator (10) includes a bill inlet area (30) defined by opposed upper and lower surfaces (24, 26) and having a magnetic read head (50). A pressure device (60) is provided below the magnetic read head (50) and urges a bill B received by the inlet (30) toward engagement with the read head to press the bill into engagement with the read head and assist in moving the bill in the direction of travel of the transport system (21).

5 Claims, 6 Drawing Sheets

BILL VALIDATOR HAVING A MAGNETIC READ HEAD WITH PRESSURIZING DEVICE

BACKGROUND OF THE INVENTION

This invention relates generally to bill validators and more particularly to the provision of a bill validator having a magnetic read head and a pressurizing device arranged to press a bill into engagement with the read head, while the bill is being introduced into the validator, without binding the transport mechanism, so that even worn or wrinkled bills can be processed.

In bill validators of the type which accept paper currency or coupons, there is a problem when the bill is worn or wrinkled. The reason for this is that the transport mechanism, which carries the bill from the bill inlet into the vicinity of the read head, may bunch up and bind in the transport mechanism belts between which the bill is carried.

A solution to this problem is to provide a resilient pressurizing device which urges the bill into engagement with the magnetic read head while, at the same time, urging the bill along the transport path in the vicinity of the read head. This has been achieved herein in a manner not disclosed in the known prior art.

SUMMARY OF THE INVENTION

This invention provides a resilient pressurizing device which cooperates with the bill transport mechanism and urges the bill into flat engagement with the magnetic read head while the bill is introduced into the bill inlet. The device reduces the tendency of wrinkled and worn bills to bind under the pressure of the bill transport mechanism belts.

A magnetic read head is a useful device which may be located in a bill validator above the bill travel path so that the bill is read by the read head as the bill is passed below the read head by the bill transport mechanism. The invention herein is directed to providing a device which urges bills, even those which are worn and wrinkled, into engagement with the read head while at the same time assisting the transport mechanism to urge the bill in a flat condition in the travel direction.

This invention provides a bill validator comprising an upper chassis, a magnetic read head mounted to the upper chassis, a lower housing disposed in spaced relation from the upper chassis to define a bill receiving inlet area, a bill transport system arranged to move the bill inwardly from the inlet receiving area to a stacking position, and means mounted to the lower housing for applying a force in the direction of the magnetic read head tending to urge bill passing through the inlet area against the magnetic read head to facilitate reading of bill data.

It is an aspect of this invention to provide that the bill transport system includes a pair of pulleys having a shaft extending therebetween, and the force applying means includes a first wheel mounted to the shaft for rotation with the shaft and a second wheel connected by a belt to the first wheel and arranged to swing into engagement with a bill as it passes the magnetic read head.

It is another aspect of the invention to provide that the first and second wheels are connected by a yoke and belt arrangement, the yoke being freely mounted relative to the shaft and the second wheel being freely mounted relative to the yoke.

It is yet another aspect of the invention to provide that the bill transport system includes a first drive belt system and a second idler belt system, said belt systems cooperating to pull the bill into the validator and across the read head, one of said systems providing means for rotating said first wheel.

It is still another aspect of the invention to provide that said yoke is resiliently supported by the lower housing, and another aspect that the lower housing includes opposed leaf springs and the yoke includes support means engageable by said leaf springs.

An aspect of the invention is to provide that reverse rotation of the shaft tends to swing the second wheel away from the magnetic head.

It is another aspect of the invention to provide that the first wheel rotates at the same speed as the bill transport system pulleys connected to the shaft and the belt connecting the first and second wheels travels at the same speed as the belt transport system to assist in moving the bill inwardly.

This bill validator includes a device for applying pressure to a magnetic read head which is easy to install, inexpensive to produce and is most effective for its intended purpose.

BRIEF DESCRIPTION OF THE DRAWINGS

FIG. 9 is a cross-sectioned view taken on line 9—9 of FIG. 8 showing the installation of the pressurizing device.

DESCRIPTION OF THE PREFERRED EMBODIMENT

Figure 1:
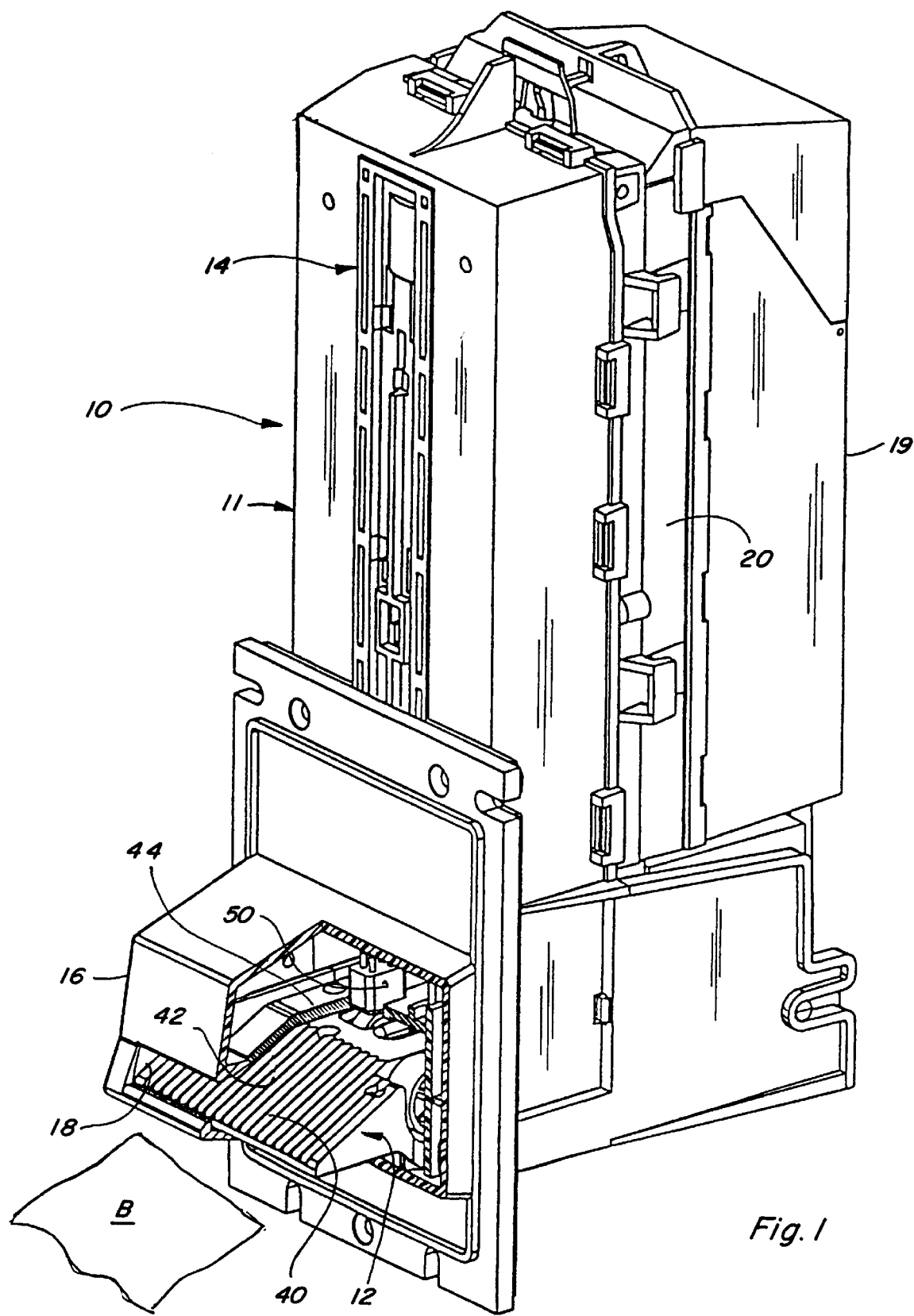
FIG. 1 is a perspective view of a bill validator incorporating the invention.
Figure 3:
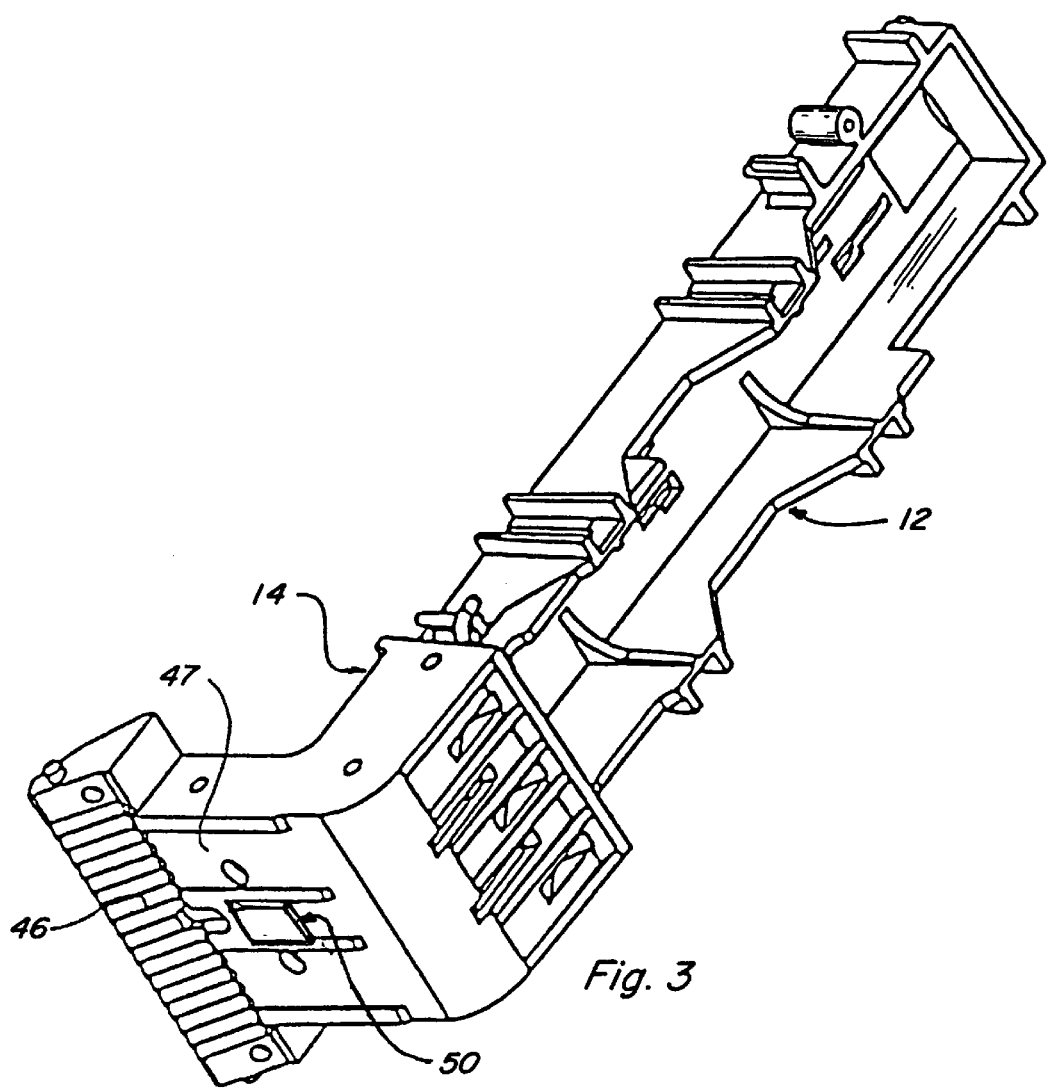
FIG. 3 is perspective view of the underside of the chassis.
Figure 2:
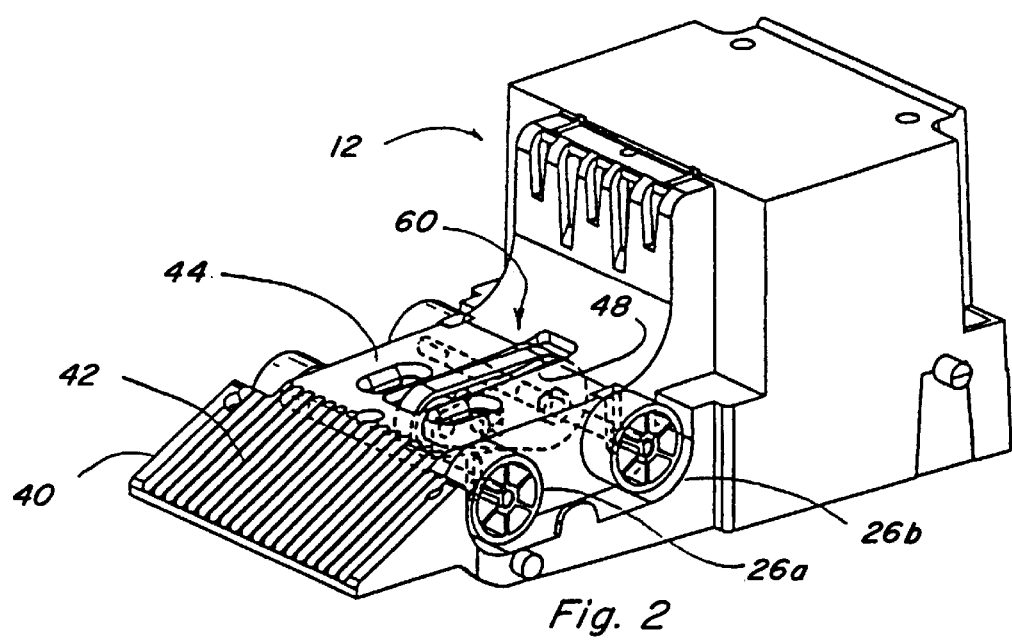
FIG. 2 is a perspective view of the validator lower housing.

Referring now by reference numerals to the drawings and first to FIG. 1 it will be understood that the bill validator 10 includes essentially a generally horizontal lower housing 12, and a generally vertical upper housing 11 for a chassis 14, the lower housing and the chassis cooperating to define a bill inlet area within the validator. The validator 10 also includes a cover 16 defining a bill receiving opening 18; an adapter frame 20 attached to the upper housing 11 and a cash box 19 attached to the adapter frame 20.

Figure 4:
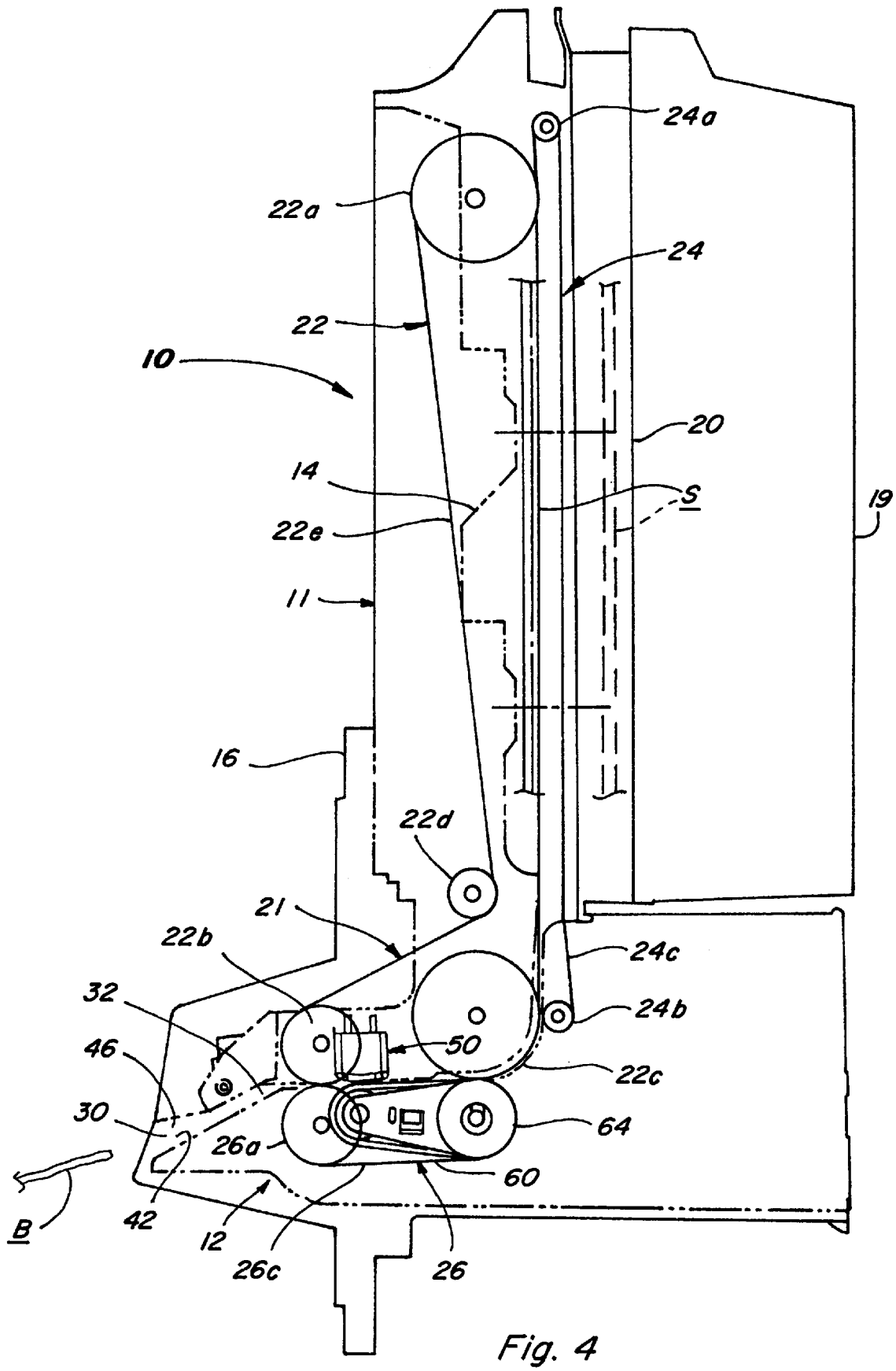
FIG. 4 is a generally schematic side elevational view of the bill validator.

The bill validator 10 in the embodiment illustrated includes a bill transport system 21, as shown schematically in FIG. 4, comprising essentially three sets of spaced pairs of belt assemblies, namely twin drive belt assemblies 22 and associated twin vertical and horizontal idler assemblies 24 and 26 respectively. Each belt assembly 22 includes upper drive pulley 22*a*, lower pulleys 22*b* and 22*c* intermediate pulley 22*d* and endless belt 22*e*; each vertical idler belt assembly 24 includes upper idler pulleys 24*a* and 24*b* and endless belt 24*c* and each belt assembly 26 includes pair of pulleys 26*a* and 26*b* and an endless belt 26*c*. The belt assemblies 22, 24 and 26 cooperate to draw in and transport the bill B to a stacker assembly S, indicated diagrammatically in FIG. 4, for stacking the bill B in the cash box 19. The bill validator is similar to that shown in detail in commonly owned U.S. Pat. No. 5,310,173, which is incorporated herein by reference.

As shown in FIGS. 1–4, the lower housing 12 includes a ramp section 40 having an inclined wall 42 and a generally horizontal wall 44. The upper chassis 14 includes a front section having an inclined wall 46 and a generally horizontal wall 47. The inclined wall 46 is disposed in spaced parallel relation from the lower housing inclined wall 42 to define a bill inlet area 30. The spaced, inclined lower and upper walls 42 and 46, respectively, cooperate to define the bill inlet inner area 32, which is adapted to receive a bill B, and the lower horizontal wall 44 is provided with a generally rectangular opening 48.

A magnetic read head 50 is mounted within the bill validator to the chassis 14 and arranged so that it is located just above the spaced pairs of belts 22e and 26c, in the area generally between the pulleys 26a and 26b, facing the rectangular opening 48.

It is important that the bill B be in engagement with the magnetic read head 50 and that it be in a relatively flat condition as it passes below the read head. This does not present a serious problem when the bill is a crisp new bill but can present a problem when the bill is worn or wrinkled or both because such bills tend to bind. The problem is solved herein by the provision of a pressurizing device 60, constituting a force applying means, having a floating rotating member which is movable through the rectangular opening 48 toward engagement with the magnetic head 50, and a belt 70 which travels in the same direction as the transport system when the bill is moving forwardly toward the vertical stacking position. The pressurizing device 60 is movable out of engagement with the bill B when it becomes necessary to reverse the transport system 21 to remove a rejected bill.

Figure 5:
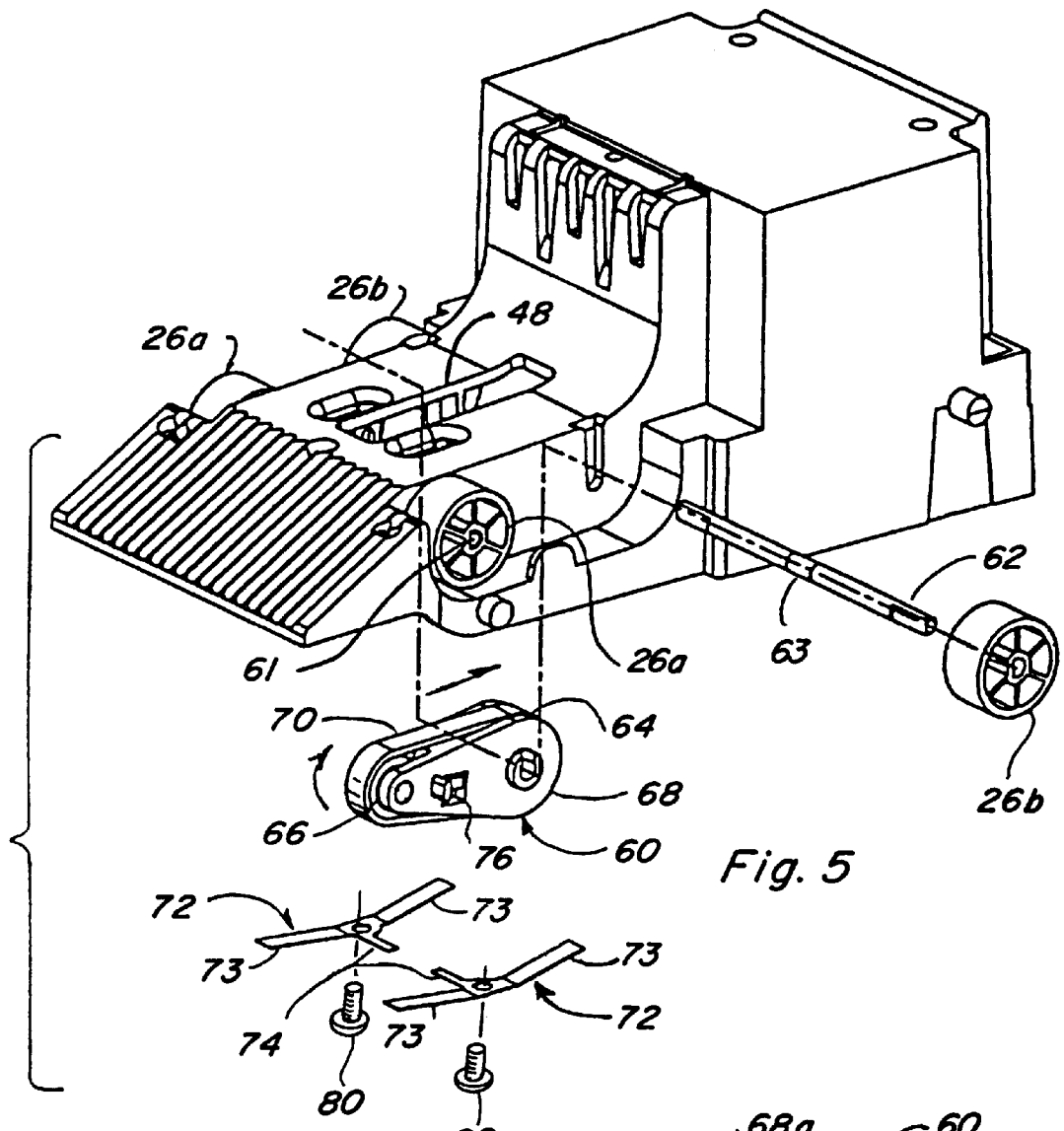
FIG. 5 is a perspective, exploded view of the pressurizing device mounted in the lower housing.

As shown in FIG. 5, the transport system pulleys 26a are connected by shaft 61 and the pulleys 26b are connected by shaft 62. In the preferred embodiment shown in FIGS. 5 and 6, the pressurizing device 60 is located midway between the laterally spaced belts of the transport system 21 and is mounted to the transverse drive shaft 62, which connects the laterally spaced pulleys 26b together. The pressurizing device 60 includes a drive wheel 64 which is fixedly mounted to a knurled central portion 63 of the drive shaft 62 so that the drive wheel 64, which is the same size as the pulleys 26b, rotates in the same direction as pulleys 26b and at the same speed. A smaller idler wheel or roller 66 is connected to the drive wheel 64 by means of a belt and yoke assembly. The belt and yoke assembly includes a yoke assembly 68 formed from opposed yoke arms 68a and 68b held together, as by a snap-connection element 75, freely mounted to each boss 65 of the wheel 64. The belt 70 extending between wheel 64 and roller 66 and the yoke arms 68a and 68b cooperate to provide a stub shaft 67a and 67b to which roller 66 is freely mounted.

The above arrangement provides that the belt 70 rotates the idler roller 66 in the same direction as the drive wheel 64 and moves the belt 70 in the same direction of travel as the transport system belts 26c and 22e. Thus, the idler pulley 66 and the belt 70 cooperate to provide a floating rotating member tending to swing into engagement with the magnetic read head 50 by clockwise rotation of the drive wheel 64. When a bill is introduced into the bill inlet and is pulled inwardly between the transport belts 21 and 22, the floating rotating member moves through the rectangular opening 48 into a pinch position engaging with the bill B and presses the bill into engagement with the magnetic read head 50.

Conversely, when a bill B is rejected, and the direction of the transport belts 21 and 22 is reversed, the floating rotating member belt 70 and roller 66 tend to swing away from the read head 50 and out of engagement with the bill B by virtue of counterclockwise rotation of the drive wheel 64.

Figure 6:
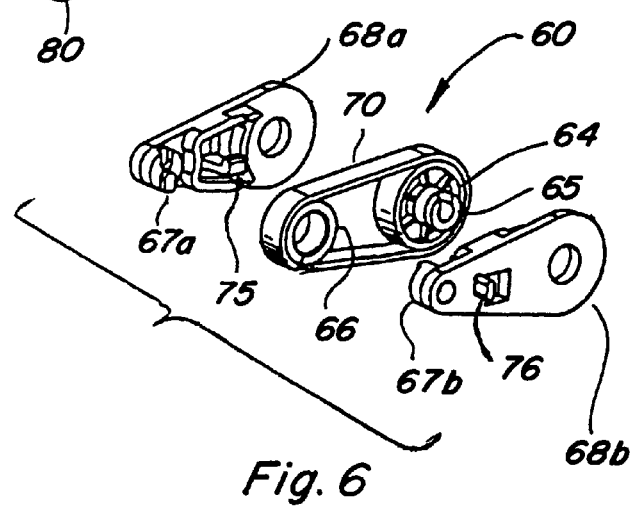
FIG. 6 is a perspective, exploded view of the pressurizing device.
Figure 7:
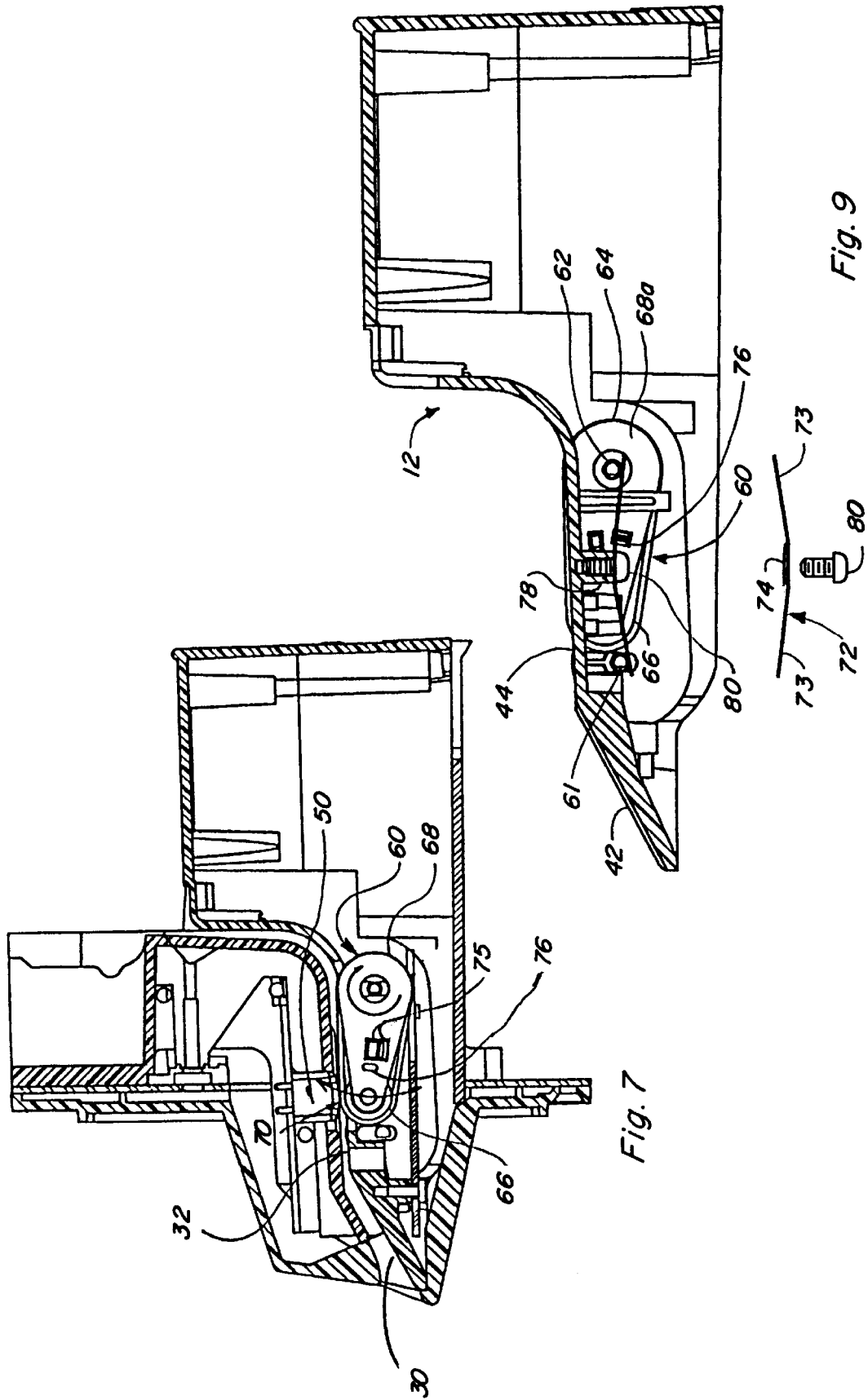
FIG. 7 is a cross-sectional view through the lower housing.
Figure 8:
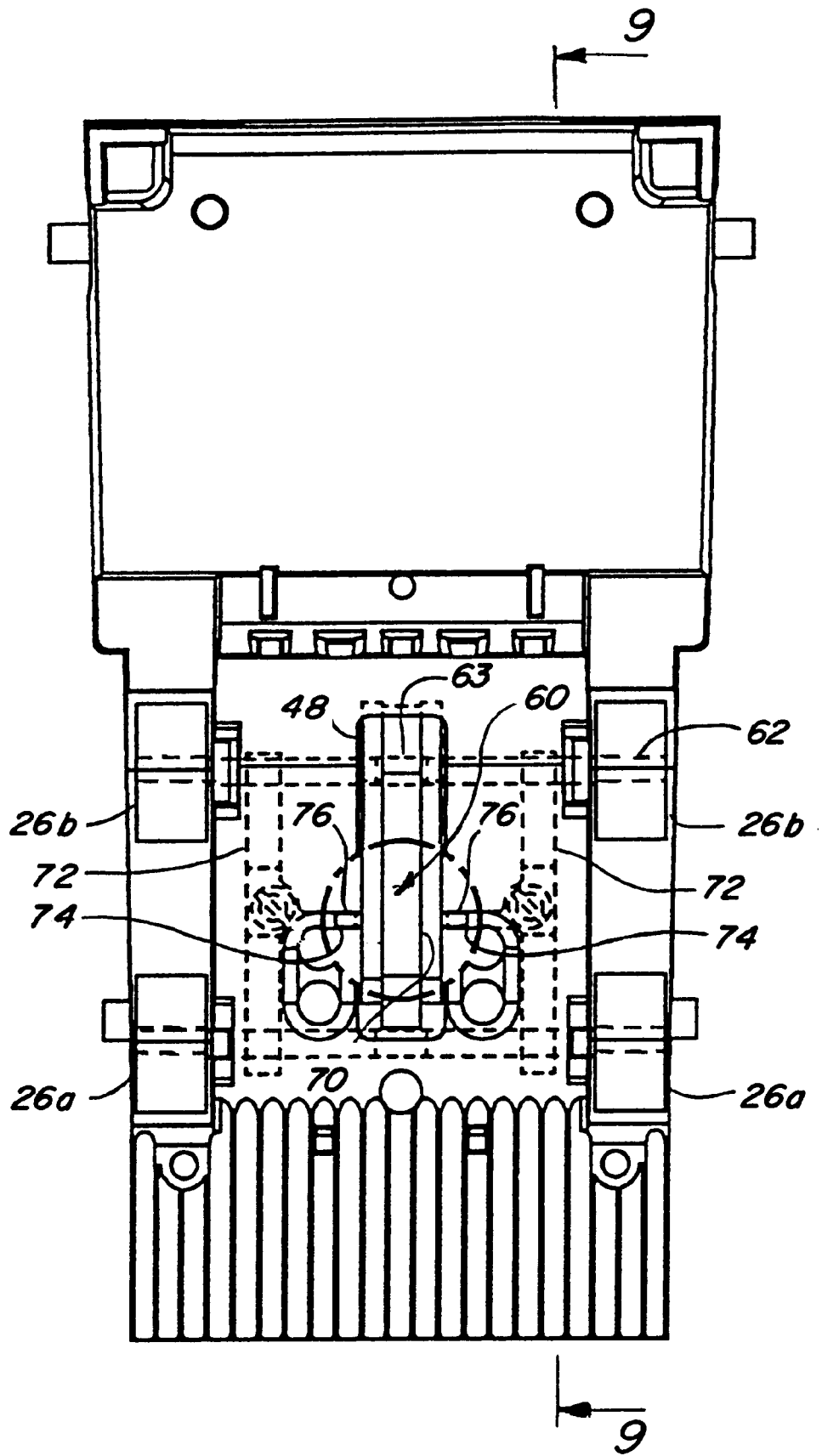
FIG. 8 is an enlarged fragmentary plan view of the lower housing.

In order to limit counter-swinging of the yoke assembly 68, this assembly is resiliently carried by T-shaped leaf springs 72. As best shown in FIGS. 5 and 6, the leaf springs 72 include ends 73 and inwardly extending transverse arms 74. As shown in FIGS. 8 and 9, the springs 72 are each connected to a depending threaded socket member 78 attached to the lower horizontal wall 44. Prior to installation the ends of the springs 72 are inclined upwardly. When installed, and held by the fasteners 80, the spring ends 73 engage the underside of shafts 61 and 62 exerting an upward pressure on said shafts which holds them in place. In this position, the leaf spring transverse arms 74 are arranged so that they are engaged by and support opposed lugs 76 extending outwardly from each of the yoke arms 68a and 68b and provide a resilient stop for the yoke assembly 68.

It will be understood from the above that when the transport system 21 is actuated the bill B is pulled into the validator by the belts 22e and 26c. At the same time, the resiliently supported yoke and belt assembly 68, 70 tends to swing in a clockwise direction under the frictional action of the rotating shaft 62, to which the yoke arms 68 are freely mounted. The result of this movement is that the idler roller 66 and belt 70 swing upwardly away from the leaf spring transverse arms 74 and into engagement with the underside of the bill and provide means for applying a force in the direction of the read head 50, to press the bill into engagement with the magnetic head 50 and at the same time assist in carrying the bill forward in an inward direction.

When the transport system 21 is counter rotated, to reverse the travel and reject the bill B, the yoke 68 supported by the springs 72 tends to swing downwardly away from the magnetic head and into engagement with the transverse arms 74 to allow the bill to pass freely in the outward direction. It will be understood that control means such as a light sensor (not shown) actuate the transport system as the bill is introduced into the inlet.

In bill validators of this type which accept paper currency or coupons, the pressurizing device 60 overcomes the tendency of worn or wrinkled bills to bind during inward travel while facilitating outward travel when a bill is rejected.

While a preferred embodiment has been described it will be readily understood by those skilled in the art that many variations are possible within the scope of the claims hereunto appended. For example, the magnetic read head could be mounted below the bill and the force applying means could be mounted above the read head.

We claim as our invention:

1. A bill validator comprising;
   (a) a housing including upper and lower portions;
   (b) a bill transport system within the housing arranged to move a bill inwardly and outwardly along a bill path;
   (c) a magnetic read head disposed on one side of the bill path; and
   (d) force applying means disposed on the other side of the bill path for applying a force in the direction of the magnetic read head tending to urge a bill against the magnetic read head when the bill is moving in one direction and tending to remove the force from the magnetic read head when the bill is moving in the other direction,
   (e) the bill transport system including a shaft;

(f) the force applying means including a first wheel freely mounted to the shaft, a second wheel disposed in spaced relation to the first wheel, so that the second wheel is swingable about the first wheel, and resilient means tending to urge the second wheel into operative engagement with the magnetic read head when the bill is moving in one direction and tending to urge the second wheel out of operative engagement with the magnetic read head when the bill is moving in the other direction.

2. A bill validator as defined in claim 1, in which:

(g) the force applying means includes a belt and yoke arrangement.

3. A bill validator as defined in claim 2, in which:

(h) said yoke is resiliently supported by the lower housing.

4. A bill validator as defined in claim 3, in which:

(i) the lower housing includes opposed leaf springs and the yoke includes support means engageable by said leaf springs.

5. A bill validator as defined in claim 1, in which:

(g) reverse rotation of the shaft tends to swing the second wheel away from the magnetic head.

* * * * *